April 2, 1968   R. L. HARPER   3,375,644
FERTILIZER ATTACHMENT FOR ROTARY LAWN MOWERS
Filed May 27, 1965   4 Sheets-Sheet 1
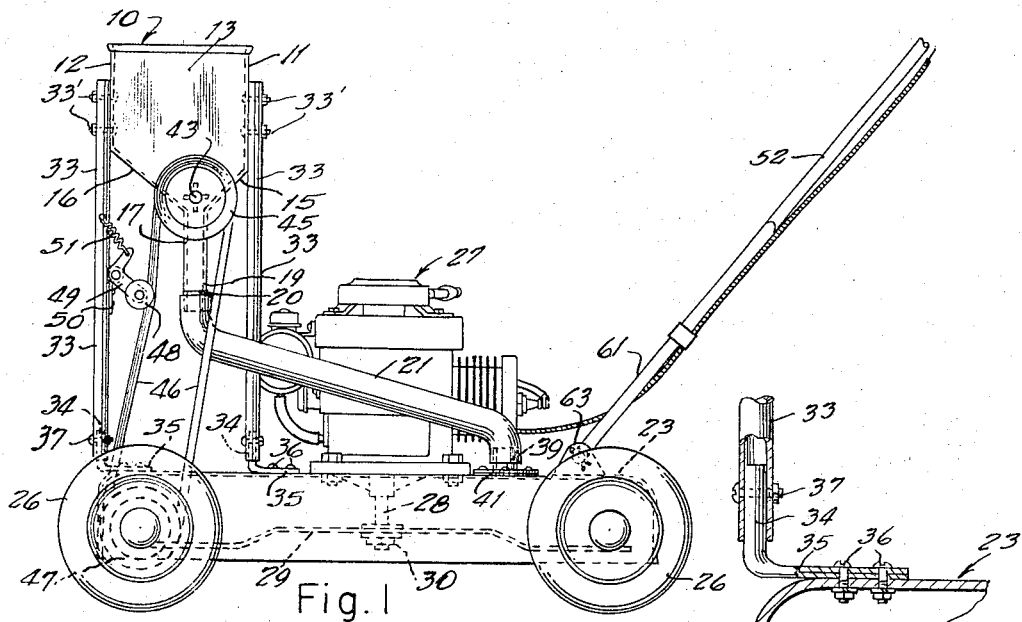
Fig. 1
Fig. 4
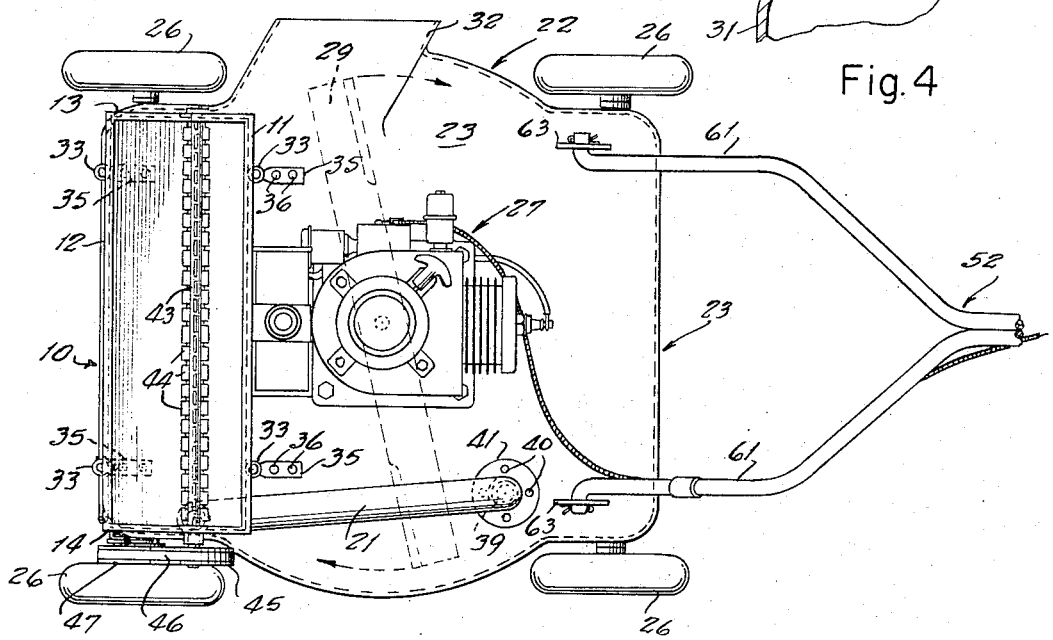
Fig. 2
Fig. 5
INVENTOR
Robert L. Harper
BY
ATTORNEY April 2, 1968  R. L. HARPER  3,375,644
FERTILIZER ATTACHMENT FOR ROTARY LAWN MOWERS
Filed May 27, 1965  4 Sheets-Sheet 2

INVENTOR
Robert L. Harper

BY Cecil L. Wood

ATTORNEY

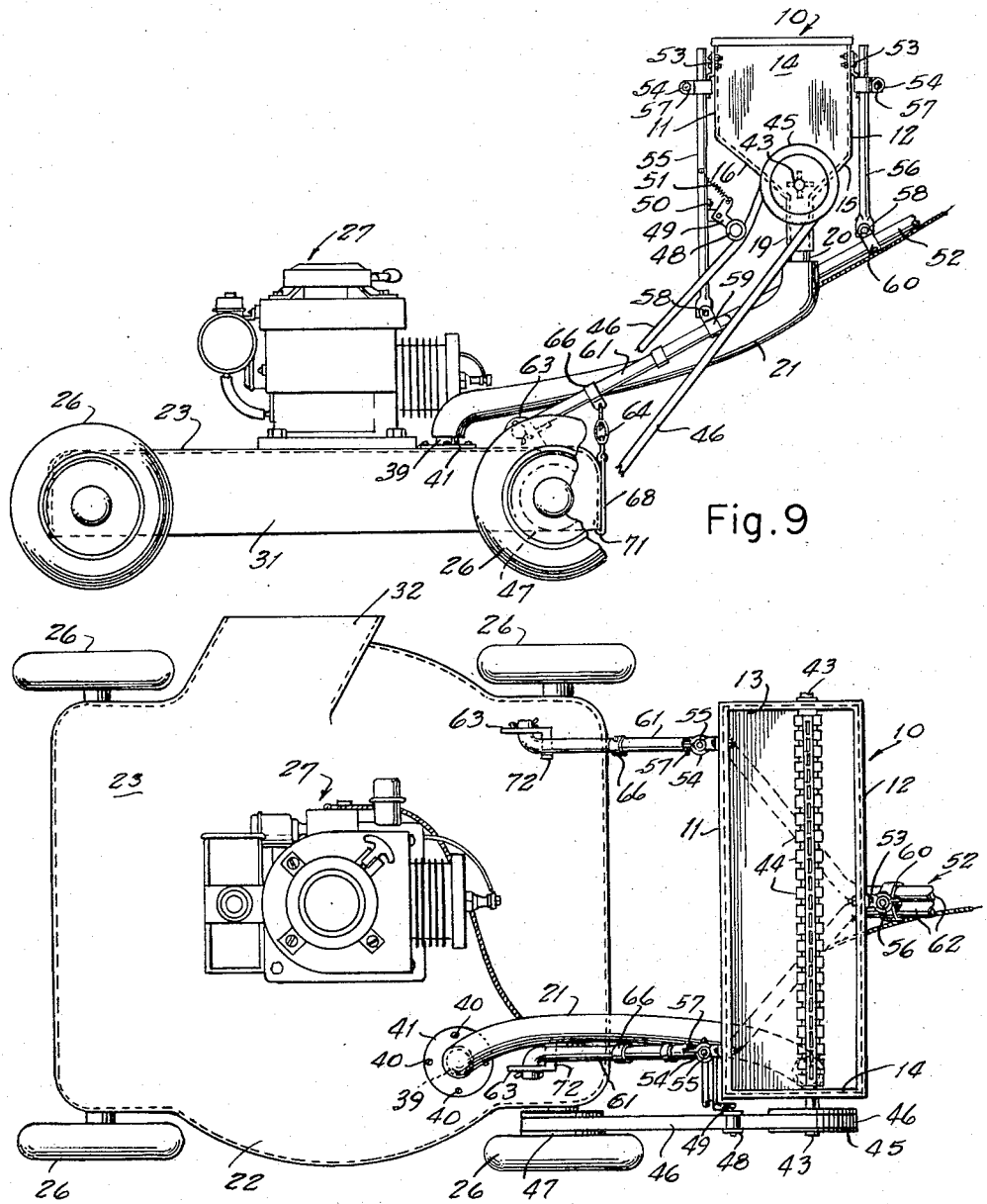

April 2, 1968 R. L. HARPER 3,375,644
FERTILIZER ATTACHMENT FOR ROTARY LAWN MOWERS
Filed May 27, 1965 4 Sheets-Sheet 4

INVENTOR.
Robert L. Harper
BY
ATTORNEY

United States Patent Office 3,375,644
Patented Apr. 2, 1968

3,375,644
FERTILIZER ATTACHMENT FOR
ROTARY LAWN MOWERS
Robert L. Harper, 3529 Asbury, Dallas, Tex. 75205
Filed May 27, 1965, Ser. No. 459,359
2 Claims. (Cl. 56—25.4)

ABSTRACT OF THE DISCLOSURE

The invention generally comprises an elongated hopper for dispensing fertilizer in granulated or comminuted form to the rotating blade of a rotary type power driven lawn mower, and is designed to be supported on a suitable frame comprising vertical legs, the upper ends of which are attached to the hopper while their lower ends are detachably secured to the flat deck of the housing for the lawn mower. The hopper is positioned well above the mower housing, and its agitator shaft has a V-pulley on one end to receive a V-belt which is arranged over a V-pulley on one of the wheels of the lawn mower so that rotation is transmitted therefrom to the agitator shaft. A flexible conduit is connected to the outlet of the hopper and extends downwardly therefrom and is detachably connected to an opening in the top of the mower housing so that the dispensed fertilizer can be distributed by the rotating blade.

---

This invention relates to lawn type fertilizer distributors, and more particularly to fertilizer attachments for rotary type lawn mowers.

The most common type of distributor or spreader for lawn fertilizers generally comprises a hopper having wheels on an axle or shaft extending through the bottom of the hopper and having an arrangement of blades or a series of projections thereon for the purpose of stirring or agitating the fertilizer material to insure a continuous discharge thereof through the outlet openings along the bottom of the hopper, and to prevent clogging these openings, which are commonly provided with means for varying their dimensions.

Fertilizer distributors of the type referred to depend for their proper function upon the rotation of the wheels fixed to the ends of the agitator shaft by ground traction as the device is moved along, the amount of fertilizer dispensed from the hopper being constant regardless of the rate of speed at which the distribution is moved.

An object of the invention is that of providing a simple and economical mechanism by which such a fertilizer distributor can be applied to a conventional rotary type lawn mower, as an attachment capable of ready removal as desired, whereby fertilizers can be effectively and uniformly distributed or spread over a lawn during the mowing operation, and utilizing the rotary action of the mower blade to evenly distribute or broadcast the fertilizer materials.

Another object of the invention resides in the provision of apparatus by which the fertilizer is delivered in measured or predetermined quantities from the hopper into the presence of the rotating mower blade, without increasing the normal rate of discharge of the material over that which would prevail when the distributor is operated by the traction of its wheels in contact with the ground, and to provide a driven connection between the mower wheels and the agitator shaft in the distributor hopper.

Various mechanisms have been devised by which some type of fertilizer attachment could be applied to both reel and rotary types of lawn mowers, but none have proved entirely satisfactory due primarily to their lack of proper control and distribution of the fertilizer. In addition, most of such devices are not designed to be readily attached to and removed from the mower when the latter is used only for cutting operations. Also it has been proved that better distribution can be had when used in combination with a blade rotating in a horizontal plane.

Broadly, the invention contemplates the provision of a fertilizer attachment for rotary type power lawn mowers, including means for operating the fertilizer distributor only as the mower is moved along in cutting operations, and affording detachable means for conducting the fertilizer into the mower housing and into the cyclonic atmosphere created by the rapidly rotating blade.

While the foregoing objects are paramount, other and lesser objects will become apparent as the description proceeds when considered in connection with the appended drawings wherein:

FIGURE 1 is a side elevational view of one form of a fertilizer attachment embodying the invention mounted on a conventional rotary type lawn mower, illustrating the drive means and the dispensing tube.

FIGURE 2 is a plan view of the fertilizer hopper shown in FIGURE 1, and a typical lawn mower.

FIGURE 4 is a fragmentary sectional view, on line 4—4 of FIGURE 3, illustrating one of the mounting brackets on the mower housing.

FIGURE 5 is a fragmentary sectional view, on line 5—5 of FIGURE 3, of the flanged fitting in the top of the mower housing for attaching the outlet end of the flexible discharge tube.

FIGURE 9 is a side elevational view of a modification of a detechable mounting for the hopper, the latter being attached to the mower handles.

FIGURE 10 is a plan view of the arrangement shown in FIGURE 9.

Figure 11:
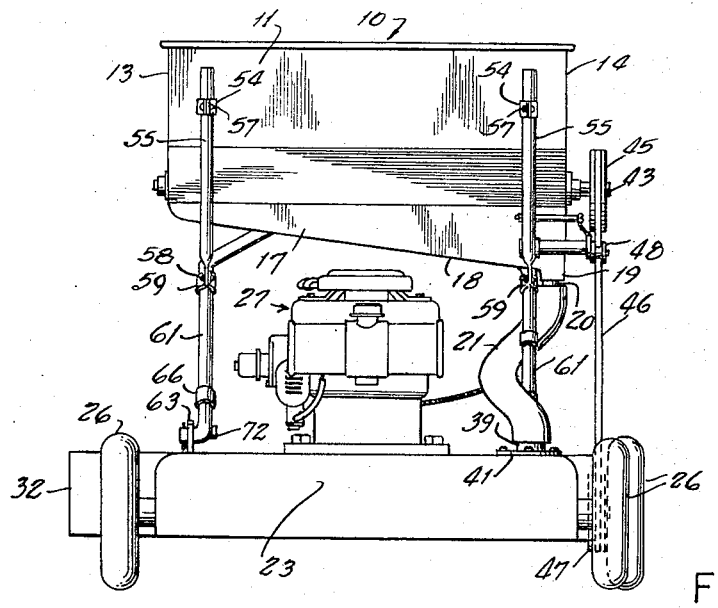
FIGURE 11 is a front elevational view of the mounting device for the hopper as shown in FIGURES 9 and 10.
Figure 13:
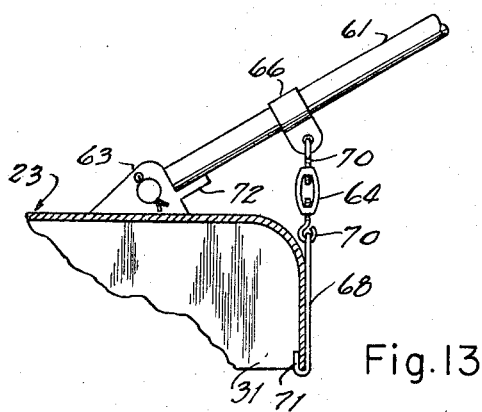
Figure 14:
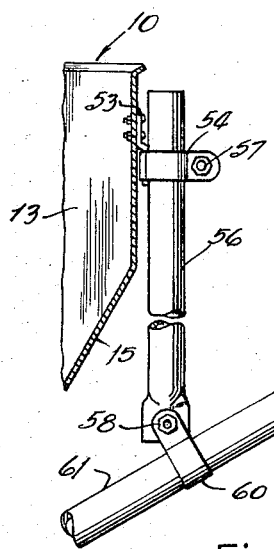

FIGURE 13 is an illustration of a modified tie down bracket for the mower handles, the latter being shown fragmentarily, and the housing being fragmentarily shown in section, and FIGURE 14 is a side elevational view of one of the mounting standards for the hopper, as employed in the arrangement shown in FIGURES 9, 10 and 11, the handles being fragmentarily shown and the hopper being shown fragmentarily in section.

In its broadest concept the invention comprises a fertilizer hopper 10 which may be of any desired form but preferably rectangular, having vertical side walls 11 and 12 and end walls 13 and 14, the lower portions 15 and 16 of the side walls being inclined inwardly and downwardly defining an elongated trough by which the fertilizer materials are continuously concentrated at the convergence of the lower side walls 15 and 16 along which are a series of outlet openings (not shown) whose diameters may be increased or decreased, as desired, to regulate the volume of flow of the fertilizer therethrough by adjustable sliding closures (also not shown). This arrangement is generally conventional.

Figure 3:
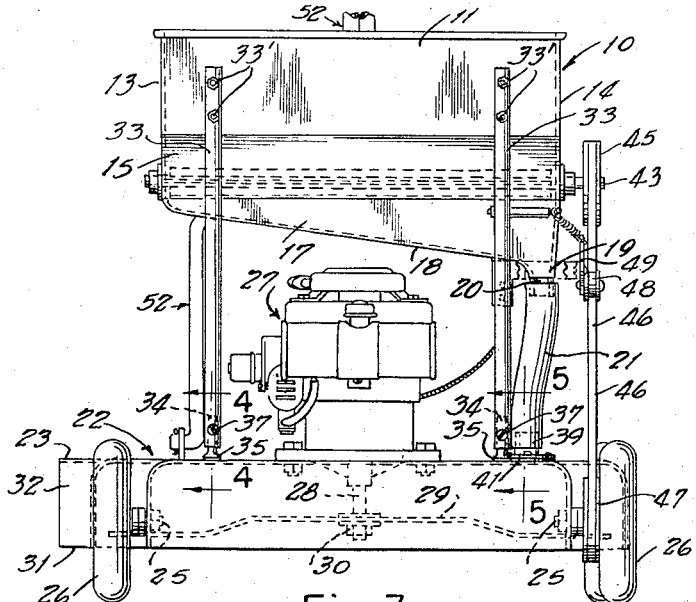
FIGURE 3 is a front elevational view of the invention, as shown in FIGURE 1, illustrating the inclined discharge chute at the hopper bottom for the fertilizer material.
Figure 6:
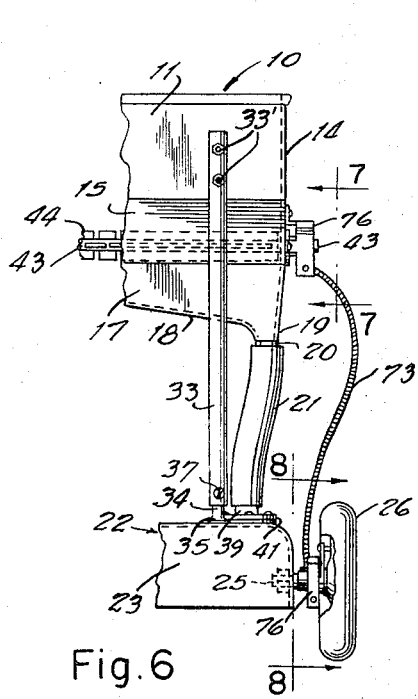
FIGURE 6 is a fragmentary elevational view of one end of the hopper and a side of the mower housing showing a driven flexible shaft for rotating the hopper agitator shaft.

In the present invention a discharge chute 17 is integrally attached or formed with the hopper 10 below and coextensive with the series of outlet openings to receive the fertilizer discharged therethrough and the bottom 18 of the chute 17 is inclined downwardly toward one end, as shown in FIGURES 3, 6 and 11, in which is provided an outlet spout 19 which is preferably cylindrical and has a tubular fitting 20 therein to which one end of a flexible conduit 21 is attached, as shown in FIGURES 1, 3, 6, 9 and 11.

Illustrated in the attached drawings is a typical conventional rotary type mower 22 which has a relatively shallow flat housing 23 having front and rear axles 24 and 25 on which wheels 26 are mounted for free rotation. A motor 27 is supported on the housing 23, generally in the center thereof, whose shaft 28 extends through the top of the housing 23 and has a cutting blade 29 attached to its lower end by suitable means, such as a nut and washer 30, as shown best in broken lines in FIGURES 1, 2 and 3. The depending flange 31 of the housing 23 completely surrounds and encloses the blade 29 except for a hooded outlet 32 for the discharge of grass cuttings.

The hopper 10 can be detachably mounted on the forward end of the housing 23 of the mower 22, in the manner shown in FIGURES 1, 2 and 3, supported on tubular legs 33, the upper ends of which are attached to the respective side walls 15 and 16 of the hopper 10 by bolts and nuts 33', the lowermost ends of the legs 33 embracing the cylindrical riser members 34 of angular brackets 35 whose right angular portions are flattened and secured by bolts and nuts 36 to the top of the housing 23 of the mower 22, as shown in fragmentary detail in FIGURE 4.

One pair of the brackets 35 are arranged on the front of the housing 23, and spaced from each side thereof, while the opposite pair is spaced rearwardly on the housing 23 and aligned with those on the front of the latter, as best shown in FIGURES 1 and 2. The lower ends of the legs 33 are detachably secured to the members 34 by bolts and nuts 37 which extend through the legs 33 and the members 34. The hopper assembly may be readily removed from the mower 22 by removing the bolts and nuts 37, the brackets 35 being permanently attached to the mower housing 23.

Toward the rear of the housing 23, and to one side thereof, is a circular opening 38, which may be readily formed by a conventional boring tool having an expansion cutting element thereon, and a flanged fitting 39 is arranged about the opening 38 and secured to the top of the housing 23 by bolts 40 about the flange 41, a washer 42, of a yieldable material, being disposed between the flange 41 and the housing 23, as shown fragmentarily and in section in FIGURE 5. The fitting 39 is cylindrical and has a diameter equal to that of the tubular fitting 20 in the outlet spout 19 of the hopper 10. The flexible conduit 21 is connected at its upper and lower ends to the fittings 20 and 39, respectively, in the manner shown in FIGURES 1, 2 and 3. The conduit 21 is inclined downwardly from the hopper discharge chute 17 to the fitting 39.

The hopper 10 has an agitator shaft 43 arranged longitudinally thereof and immediately above the series of openings (not shown) in its bottom and is journalled in the lowermost portions of the end walls 13 and 14 of the hopper 10. A series of agitator elements 44 are spaced along the shaft 43 in staggered relationship, as shown in FIGURES 2 and 10. One end of the shaft 43 is extended through the end wall 13 and has a V-pulley 45 thereon over which a V-belt 46 is arranged and which also embraces a V-pulley 47 attached to the inner side of one of the front wheels 26, as shown in FIGURES 1 and 2.

Yieldable tension is applied to the belt 46 by an idler pulley 48 on a bell-crank 49 pivotally attached to a bracket 50 secured to one of the legs 33 and is biased by a spring 51 which is connected to the leg 33 above the bracket 50, as shown in FIGURE 1. With this arrangement the belt 46 is restrained against slippage on the pulleys 45 and 47.

It will become apparent, therefore, that the agitator shaft 43 is rotated only while the mower is moved along its course, and the driving wheel 26 is rotated only by its traction on the ground. Since it is desirable that no fertilizer be discharged from the hopper 10 while the mower 22 is idle, or in a standing position, it would not be practicable to drive the agitator shaft 43 by the motor 27.

In FIGURES 9, 10 and 11 the invention is depicted in a modified form in which the hopper 10, and its associated parts, are detachably supported on the handles 52 of the mower 22. With particular reference to FIGURE 9 it will be noted that the hopper 10, which is identical with that shown in FIGURES 1, 2 and 3, is provided with angular brackets 53, two of which are secured to the front wall 11 near the ends thereof, as best shown in FIGURE 10, and another being secured to the rear wall 12 intermediate its ends. Each of the brackets 53 are embraced by clamps 54 which are arranged about the upper portions of tubular leg members 55 and 56 and secured by bolts 57.

Due to the inclination of the handles 52 of the mower 22 it is necessary that the forward leg members 55 be of greater length than the rearmost leg 56. The lowermost end of each of the leg members 55 and 56 are flattened and are secured by bolts 58 to clamps 59 and 60 which embrace the separated lower end portions 61 of the handles 52 and the upper portions 62, respectively, the latter being in juxtaposed parallel relation. The handles 52 are conventionally shaped, having their upper portions 62 in adjacent parallel arrangement while the lower portions 61 are substantially spaced, the intermediate portions being divergently angled, as indicated in FIGURE 2, and in broken lines in FIGURE 10.

In the modified structure, shown in FIGURES 9, 10 and 11, the driving elements for the agitator shaft 43 are the same as those already described with reference to the structure shown in FIGURES 1, 2 and 3, and the same numerals are employed to indicate the parts. It is apparent, however, that the V-belt 46 may be longer than that shown in FIGURES 1 and 3, and the agitator shaft 43 is driven from one of the rear wheels 26, but the V-pulley 47 is attached to the inner face of the wheel in substantially the same manner.

Figure 12:
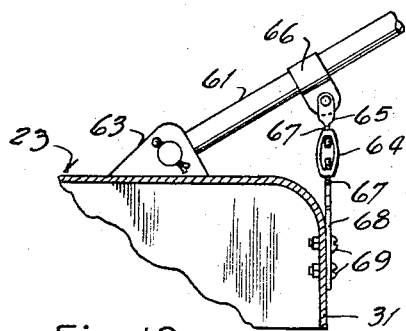
FIGURE 12 is an illustration showing an adjustable bracket for rigidly connecting the mower handles, shown fragmentarily, to the housing, the latter being fragmentarily shown in section.

When the hopper assembly is supported on the handles 52 of the mower 22, as described, it is desirable that the handles 52, which are pivoted to brackets 63 on the top of the mower housing 23 and at the rear thereof, be rigidly fixed, and for this purpose a tie-down assembly comprising a linkage which consists of a turnbuckle 64 which is connected by a link 65 to a clamp 66 on each of the lower portions of the handles 52, and to the threaded spindle 67 of a bracket 68 attached by screws 69, or other device, to the rear flange of the housing 23, as shown in FIGURE 12, or the turnbuckle 64 may be coupled between the bracket 68 and the clamp 66 by eye screws 70, as shown in FIGURE 13.

In the latter structure the bracket 68 is formed with a hook portion 71 along its lower end to engage the lower edge of the rear flange of the housing 23. The handles 52 are thus held rigidly against the lugs 72 formed with the brackets 63 and will not affect the operation of the fertilizer distribution mechanism supported on the handles 52.

Figure 7:
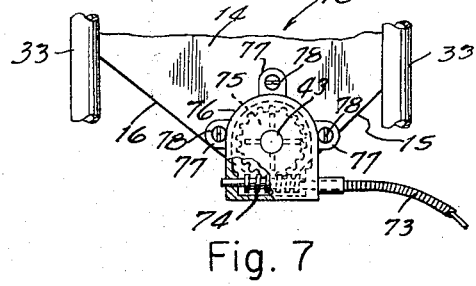
FIGURE 7 illustrates, in elevation and partial section, on line 7—7 of FIGURE 6, the worm and gear drive for the hopper shaftfi as shown in FIGURE 6, the hopper being fragmentarily shown.
Figure 8:
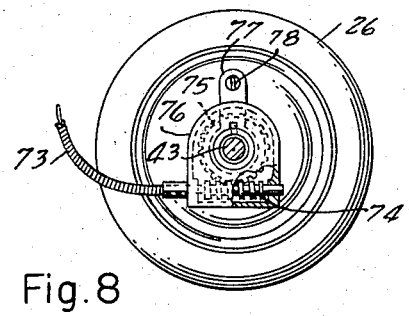
FIGURE 8 is an elevational view of one of the mower wheels, on line 8—8 of FIGURE 6, having a worm and gear drive assembly thereon for driving the hopper agitator shaft.

FIGURES 6, 7 and 8 illustrate a modified driving mechanism in which is embodied a flexible shaft 73 on each end of which is provided a worm 74 meshed with a worm gear 75 in a housing 76, the latter being formed with one or more radially extending lugs 77 by which the gear housing 76 can be secured, as by screws 78, to one end of the hopper 10, as shown in FIGURE 7, and to the inner face of one of the wheels 26, as shown in FIGURE 8, the complete arrangement being operatively shown in FIGURE 6. Obviously other driving devices may be employed, such as a chain and sprockets, or the like.

It is not intended that the invention be limited to the specific structure shown and described since it is apparent that certain modifications may be made in both structure and design without departing from the spirit and intent of the invention or the scope of the appended claims.

What is claimed is:

1. In a fertilizer dispenser for lawn mowers having a flat deck housing, a motor on said housing having a vertical shaft extending into said housing and a rotatable blade on said shaft, and a pair of axles on said housing having wheels on each end thereof, and a V-pulley on one of said wheels, a dispensing hopper having a pair of legs for removably supporting the same on said housing above said motor and having an agitator shaft therein arranged longitudinally thereof, a V-pulley on said agitator shaft at one end of said hopper above the said pulley on one of said wheels, a V-belt drivingly connecting both of said pulleys whereby said agitator shaft is driven by said one of said wheels, and a flexible discharge conduit connected at its upper end to the bottom of said hopper and extending downwardly and having its opposite end connected to an opening in said housing.

2. In a fertilizer dispenser as described in claim 1, each of said legs having a detachable connection to the top of said housing, and said flexible conduit having a detachable connection with said opening in said housing.

References Cited

UNITED STATES PATENTS

| 3,043,482 | 7/1962 | Laughlin. |
| 3,100,371 | 8/1963 | Redmon _____ 56—25.4 |
| 3,102,375 | 9/1963 | Troka et al. _____ 56—255 |

ANTONIO F. GUIDA, *Primary Examiner.*